United States Patent

Gersch

[11] 4,053,252
[45] Oct. 11, 1977

[54] CUTTING TOOL HOLDER

[76] Inventor: Richard C. Gersch, 617 June Court, Traverse City, Mich. 49684

[21] Appl. No.: 683,422

[22] Filed: May 5, 1976

[51] Int. Cl.² .......................................... B23B 29/034
[52] U.S. Cl. ................................. 408/150; 279/1 Q; 279/6; 408/714
[58] Field of Search ............... 408/151, 150, 127, 714; 279/1 Q, 6, 16, 17, 18

[56] References Cited

U.S. PATENT DOCUMENTS

| 2,931,254 | 4/1960 | Briney, Jr. et al. | 408/151 |
| 3,125,903 | 3/1964 | Briney, Jr. et al. | 408/151 |

Primary Examiner—Othell M. Simpson
Assistant Examiner—Z. R. Bilinsky
Attorney, Agent, or Firm—Gifford, Chandler, Sheridan & Sprinkle

[57] ABSTRACT

A cutting tool holder for rotatably supporting a cutting bar is provided in which the radial distance between the axis of rotation of the cutting tool holder and the cutting edge of the cutting bar is adjustable. The cutting tool holder comprises a hub member having one axial end secured to a rotating machine and an eccentric bore formed in the other axial end of the hub member. The cutting bar is secured to a bar holder having a shank which is rotatably received in the eccentric bore. A circular drive plate is fastened across the inner axial end of the bar holder and limits axial movement, but permits rotation of the bar holder within the eccentric bore. A compressible biasing member urges axial separation of the drive plate and the housing to functionally lock the bar against rotation during use. A tubular and cylindrical bearing sleeve also constructed of a compressible material is disposed within the eccentric bore between the bore and the bar holder to facilitate the rotation necessary to produce adjustment.

17 Claims, 2 Drawing Figures

CUTTING TOOL HOLDER

BACKGROUND OF THE INVENTION

I. Field of the Invention

The present invention relates to a tool holder for a cutting bar in which the radial distance between the axis of rotation of the tool holder and cutting edge of the cutting bar is adjustable and more particularly to such a tool holder in which the bearing sleeve and the biasing means are replaced by members constructed of a compressible material.

II. Description of the Prior Art

There have been many previously known tool holders which are particularly adapted for use in conjunction with cutting bars. Of these, O. R. Briney and J. W. Briney in their U.S. Pat. Nos. 3,125,903 and 2,833,169 disclose cutting tool holders for cutting bars in which the radial distance between the axis of rotation of the holder and the cutting edge of the cutting bar is adjustable.

These previously known tool holders achieve this adjustability feature by means of a bore in the tool holder which is eccentric to the axis of rotation of the tool holder. A cutting bar is secured to a bar holder having a shank which is received within the eccentric bore. Rotation of the bar holder within the eccentric bore thus varies the radial distance between the cutting edge of the cutting bar and the axis of rotation of the tool holder.

Previously a sleeve of ball bearings has been disposed between the eccentric bore and the shank of the bar holder. The ball bearings not only prevent radial movement of the bar holder within the eccentric bore but also permit a smooth rotation of the bar holder within the eccentric bore.

These previously known ball bearing sleeves, however, suffer several disadvantages unknown to the present invention. One disadvantage is that the ball bearing sleeves must be protected from dirt and debris by seal members or the like which require periodic replacement. However, even with the seal members, dirt and debris often reach the ball bearing sleeve which necessitates cleaning and perhaps replacement of the ball bearings. Such maintenance is not only expensive to perform, but also results in down time for the cutting tool holder.

A further disadvantage of the previously known tool holders with ball bearing sleeves is that the initial cost of the ball bearing sleeve is relatively high. Moreover, the ball bearing sleeve eventually wears out and requires an expensive replacement.

A still further disadvantage of these previously known tool holders with ball bearing sleeves is that the ball bearing sleeves are prone to failure. Failure of the ball bearing sleeve during a cutting operation is not only likely to damage the workpiece, but also presents a serious safety hazard for the operator of the cutting machine. Such cutting tool holders have also employed relatively expensive spring members to bias the bar axially as a means of frictionally retaining the tool bar in its adjusted rotated position.

SUMMARY OF THE PRESENT INVENTION

The cutting tool holder of the present invention obviates the above mentioned disadvantage of the previously known cutting tool holders by providing a cutting tool holder without a ball bearing sleeve and without conventional spring members and which is not only simple in construction, but also virtually maintenance free.

In brief, the cutting tool holder of the present invention comprises a hub adapted to be rotated around its axis of rotation by a rotating machine. The shank of a bar holder is rotatably received in an eccentric bore in the hub and a cutting bar, in turn, is secured to the bar holder. Thus rotation of the bar holder within the eccentric bore varies the radial distance between the axis of rotation of the tool holder and the cutting edge of the cutting bar.

In contrast to the previously known devices of this type, a tubular and cylindrical bearing sleeve constructed of a compressible material is interposed between the eccentric bore and the bar holder. The bearing sleeve replaces the previously known ball bearing sleeves. The spring normally used in such devices is also replaced by a compressible member. The sleeve and member both of which are constructed of a compressible material, provide a relatively inexpensive means permitting radial movement of the bar holder to provide adjustment while at the same time frictionally retaining the bar against rotation at the adjusted position during use of the bar.

The compressible bearing sleeve achieves many advantages over the previously known ball bearing sleeves. In particular, the compressible sleeve acts as its own seal thus eliminating the need for additional seal members to protect the bearing sleeve from dirt and debris. Consequently, unlike ball bearing sleeves, periodic maintentance and cleaning of the compressible bearing sleeve is unnecessary.

More importantly, however, the compressible bearing sleeve as well as the compressible spring member are virtually immune from wear and tear so that periodic replacement of the compressible members is unnecessary. Moreover, the compressible members are less costly than the previously known ball bearing sleeves and spring members.

BRIEF DESCRIPTION OF THE DRAWINGS

A better understanding of the present invention will be had upon reference to the following detailed description when read in conjunction with the accompanying drawing wherein like reference characters refer to like parts throughout the several views, and in which.

DETAILED DESCRIPTION OF THE PRESENT INVENTION

Figure 1:
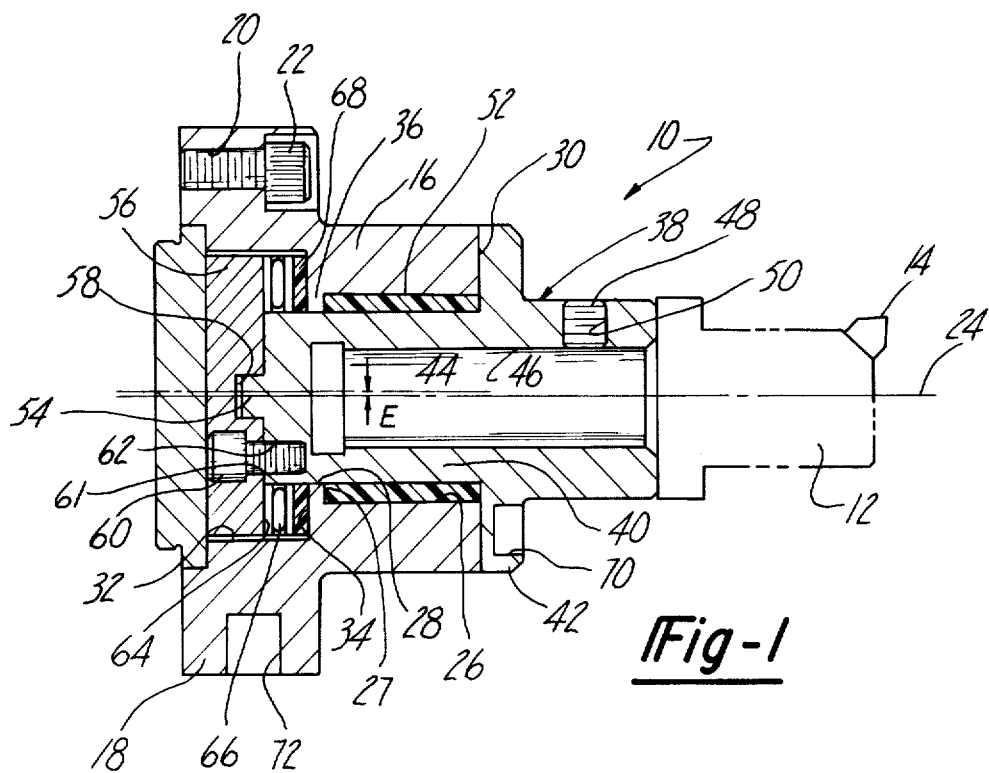
FIG. 1 is a side cross-sectional view showing the cutting tool holder of the present invention.
Figure 2:
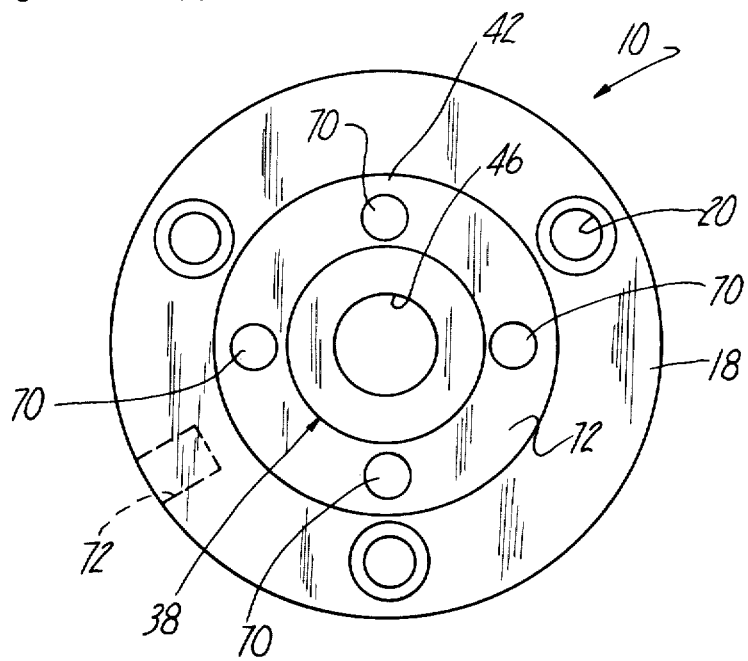
FIG. 2 is a plan view of the of the front axial end of the tool holder of the present invention

With reference to the drawing, the cutting tool holder 10 of the present invention is thereshown and comprises a generally cylindrical hub member 16 having a radial flange 18 at the rearward axial end of the hub member 16. A plurality of bolts 22 are disposed through a like number of axial bores 20 through the radial flange 18 of the hub member 16 and threadably engage a chuck (not shown) for securing the hub member 16 to a rotating machine (not shown). Upon actuation, the rotating machine rotates the hub member 16 around its axis of rotation 24.

An eccentric, or offset bore 26, is machined in the outer axial end of the hub member 16 thus forming a forwardly facing annular abutment surface 30 on the hub member 16. The axis of the eccentric bore 26 is parallel to, but spaced from, the axis of rotation 24 and this eccentricity is indicated at E. In addition, a through bore 28 of smaller diameter than the eccentric bore 26 extends axially through the hub member 16 and forms an annular abutment surface 27 at its intersection with the eccentric bore 26.

A circular recess 32, which may be coaxial with either the axis of rotation 24 or the eccentric bore 26, is provided at the inner axial end of the hub member 16. The recess 32 is of greater diameter than the through bore 28 and thus forms a rear annular abutment surface 34 at its intersection with the through bore 28. In addition, the circular recess 32 and the eccentric bore 26 together form a radially inwardly projecting flange protion 36 on the hub member 16.

A generally cylindrical bar holder 38 having a shank portion 40 is provided so that the shank portion 40 fits within the eccentric bore 26. An outer annular flange 42 on the bar holder 38 abuts against the annular abutment surface 30 on the hub member 16 to limit the axial position of the bar holder 38 within the hub member 16.

The shank 44 of a cutting bar 12, such as a boring bar and having a cutting edge 14, is positioned within an axial bore 46 in the bar holder 38. In order to secure the cutting bar 12 to the bar holder 38, an Allen set screw 48 or similar means threadably engages a transverse bore 50 in the bar holder 38 so that upon tightening, the set screw 48 abuts against and locks the shank 44 of the cutting tool 12 to the bar holder 38.

A cylindrical and tubular bearing sleeve 52 constructed of a compressible material, for example, neoprene, nylon, or teflon, is disposed around the shank 40 of the bar holder 38 and within the eccentric bore 26. The bearing sleeve 52 is preferably elongated and extends from the outer annular surface 30 to the inner annular abutment surface 27 of the hub member 16. The bearing sleeve 52 is dimensioned so that with the bar holder shank 40 in the eccentric bore 26, the bearing sleeve 52 is in a state of radial compression. As will become hereinafter apparent, the bearing sleeve 52 facilitates the rotation of the bar holder 38 within the eccentric bore 26 and in this respect replaces the bearing sleeves usually provided for devices of this kind.

The inner end of the shank 40 of the bar holder 38 extends into the circular recess 32 at the inner end of the hub member 16 and includes a transverse tongue member 54 extending thereacross. An annular ring 68 preferably also constructed of a compressible material and a thrust bearing 66 are placed within the circular recess 32 and around the bar holder shank 40 so that one axial end of the compressible annular ring 68 abuts the abutment surface 34 while the thrust bearing 66 abuts against the other axial end of the compressible annular ring 68.

A circular drive plate 56 of smaller diameter than the circular recess 32 and having a transverse groove 58 with a square cross-sectional shape is positioned within the circular recess 32 so that the tongue 54 on the bar holder 38 is received within the groove 58 of the drive plate 56. Simultaneously, the thrust bearing 66 and the compressible ring 68 are sandwiched between the outer periphery 64 of the drive plate 56 and the abutment surface 34. Axial bolts 60 extend through bores 61 in the drive plate 50 and threadably engage threaded bores 62 in the bar holder shank 40 to thereby rigidly secure the drive plate 56 to the bar holder 38.

The compressible ring 68 is compressed as the drive plate 56 is secured to the bar holder shank 40 so that the ring 68 resiliently urges the bar holder flange 42 against the annular abutment surface 30 on the hub member 16. The compressible ring 68 thus replaces the spring members usually provided for these types of tool bars and moves the surface 30 against the flange 42 to provide a frictional engagement which effectively prevents rotation of the bar holder 38 once it has been rotated to its adjusted position.

Although any appropriate means may be used to rotate the bar holder 38 in the eccentric bore 26 to thereby radially move the cutting edge 14 of the cutting bar 12, preferably the bar holder flange 42 includes a plurality of axial recesses 70 while a radial recess 72 is formed in the radial flange 18 of the hub member 16. Thus by the insertion of the proper tools within the recesses 70 and 72, the bar holder 38 may be rotated in the bore 26. During a cutting operation, the compressive forces from the compressible sleeve 52 maintain a firm abutting engagement of the bar holder flange 42 with the outer hub abutment surface 30 and this in cooperation with the frictional engagement between the abutment surface 30 and the flange 42 as produed by the compressible member 68 prevents rotation of the bar holder 38 within the bore 26.

As is well known in the art due to the eccentricity between the bore 26 and the axis of rotation 24 of the hub member 16, rotation of the bar holder 38 within the eccentric bore 26 with the attached cutting bar 12 varies the radial distance between the axis of rotation 24 and the cutting edge 14 of the cutting bar 12. Consequently, the precise boring diameter may be obtaind by merely rotating the bar holder 38 within the eccentric bore 26.

The compressible bearing sleeve 28 facilitates the necessary rotation of the bar holder 38 within the eccentric bore 26 and achieves many advantages over the previously known bearing rings which it replaces. Unlike the previously known ball bearing rings, the compressible bearing sleeve 52 provides a constant contact bearing surface between the eccentric bore 26 and the bar holder 38 which is maintenance free and virtually immune to wear and tear. Moreover, unlike the previously known ball bearing sleeves, the compressible bearing sleeve 52 cannot fail during a cutting operation thereby eliminating this previously known hazard in the machine shop. It is substantially lss costly than bearing rings.

The compressible member 68 is likewise less expensive than the spring member it replaces and provides a virtually maintenance free biasing means.

Having described my invention, however, many modifications thereto will become apparent to those skilled in the art to which it pertains without deviation from the spirit of the invention as defined by the scope of the appended claims.

What is claimed is:

1. A cutting tool holder, comprising:
 a hub member having a mounting end and an outwardly extending end and adapted to be rotated around its axis of rotation, said hub member having a bore formed therein eccentric to said axis of rotation;
 a bar holder having a shank portion disposed in said hub bore and adapted to support a cutting bar having a cutting edge;
 means for securing said bar holder in said bore while permitting rotation of said bar holder in said bore whereby rotation of said bar holder in said bore alters the radial distance of the cutting edge of said cutting bar from said axis of rotation, and a tubular and cylindrical bearing sleeve integrally constructed of a compressible polymer disposed between said eccentric bore and the shank of said bar holder.

2. The invention as defined in claim 1, wherein said bar holder includes an annular flange which abuts against an annular surface on the outwardly extending end of said hub member, said hub member including a second annular surface facing the mounting end of said hub member, wherein said means for securing said bar holder in said bore further comprises:

a disc-shaped drive plate secured to the inner axial end of said bar holder; and an annular bearing ring constructed of a compressible polymer and disposed between said drive plate and the second annular surface of said hub member to urge said annular flange into frictional engagement with said first mentioned annular surface of said hub.

3. The invention as defined in claim 2, and including a thrust bearing between said bearing ring and said drive plate.

4. The invention as defined in claim 3, wherein said bearing ring is in a state of compression.

5. The invention as defined in claim 1, wherein said bearing sleeve is in a state of compression.

6. The invention as defined in claim 2, wherein said bar holder shank includes a tongue member which is received in a groove on said drive plate.

7. A cutting tool holder, comprising:

a hub member having a mounting end and an outwardly extending end and adapted to be rotated around its axis of rotation, said hub member having a cylindrical bore formed therein eccentric to said axis of rotation;

a bar holder having a cylindrical shank portion disposed in said hub bore and adapted to support a cutting bar having a cutting edge;

means for securing said bar holder in said bore while permitting rotation of said bar holder in said bore whereby rotation of said bar holder in said bore alters the radial distance of the cutting edge of said cutting bar from said axis of rotation, and a tubular and cylindrical bearing sleeve constructed of a compressible material disposed between said eccentric bore and the shank of said bar holder whereby substantially the entire outer periphery of said bearing sleeve flatly abuts against the eccentrical bore and whereby substantially the entire inner periphery of said bearing sleeve flatly abuts against the outer periphery of said shank.

8. The invention as defined in claim 7, wherein said bar holder includes an annular flange which abuts against an annular surface on the outwardly extending end of said hub member, said hub member including a second annular surface facing the mounting end of said hub member, wherein said means for securing said bar holder in said bore further comprises:

a disc-shaped drive plate secured to the inner axial end of said bar holder; and an annular bearing ring constructed of a compressible material and disposed between said drive plate and the second annular surface of said hub member to urge said annular flange into frictional engagement with said first mentioned annular surface of said hub.

9. The invention as defined in claim 8, including a thrust bearing between said bearing ring and said drive plate.

10. The invention as defined in claim 9, wherein said bearing ring is in a state of compression.

11. The invention as defined in claim 7, wherein said bearing sleeve is in a state of compression.

12. The invention as defined in claim 8, wherein said bar holder shank includes a tongue member which is received in a groove on said drive plate.

13. The invention as defined in claim 7 wherein the bearing sleeve is of one piece construction.

14. A cutting tool holder, comprising:

a hub member having a mounting end and an outwardly extending end and adapted to be rotated around is axis of rotation, said hub member having a bore formed therein eccentric to said axis of rotation;

a bar holder having a shank portion disposed in said hub bore and adapted to support a cutting bar having a cutting edge;

means for securing said bar holder in said bore while permitting rotation of said bar holder in said bore whereby rotation of said bar holder in said bore alters the radial distance of the cutting edge of said cutting bar from said axis of rotation, and a tubular and cylindrical bearing sleeve constructed of a compressible material disposed between said eccentric bore and the shank of said bar holder, said bar holder including an annular flange which abuts against an annular surface on the outwardly extending end of said hub member, said hub member including a second annular surface facing the mounting end of said hub member, and said means for securing said bar holder in said bore further comprises a disc-shaped drive plate secured to the inner axial end of said bar holder; and an annular bearing ring constructed of a compressible material and disposed between said drive plate and the second annular surface of said hub member to urge said annular flange into frictional engagement with said first mentioned annular surface of said hub.

15. The invention as defined in claim 14 and including a thrust bearing between said bearing ring and said drive plate.

16. The invention as defined in claim 14 wherein said bearing ring is in a state of compression.

17. The invention as defined in claim 14 wherein said bar holder shank includes a tongue member which is received in a groove on said drive plate.

* * * * *